US007710408B2

(12) United States Patent
Ericson (10) Patent No.: US 7,710,408 B2
(45) Date of Patent: May 4, 2010

(54) CENTRALIZED INFORMATION MANAGEMENT BASED UPON POSITION INFORMATION

(75) Inventor: Petter Ericson, Malmo (SE)

(73) Assignee: Anoto AB, Lund (SE)

( * ) Notice: Subject to any disclaimer, the term of this patent is extended or adjusted under 35 U.S.C. 154(b) by 1529 days.

(21) Appl. No.: 09/746,778

(22) Filed: Dec. 22, 2000

(65) Prior Publication Data

US 2002/0091711 A1    Jul. 11, 2002

Related U.S. Application Data

(60) Provisional application No. 60/210,654, filed on Jun. 9, 2000, provisional application No. 60/208,164, filed on May 31, 2000, provisional application No. 60/208,169, filed on May 31, 2000, provisional application No. 60/208,170, filed on May 31, 2000, provisional application No. 60/177,310, filed on Jan. 21, 2000.

(30) Foreign Application Priority Data

| Aug. 30, 1999 | (SE) | ................................ 9903051 |
| Dec. 23, 1999 | (SE) | ................................ 9904745 |
| Feb. 18, 2000 | (SE) | ................................ 0000541 |
| Mar. 21, 2000 | (SE) | ................................ 0000939 |
| Mar. 21, 2000 | (SE) | ................................ 0000952 |
| Mar. 21, 2000 | (SE) | ................................ 0000953 |
| Apr. 5, 2000 | (SE) | ................................ 0001239 |
| Aug. 30, 2000 | (SE) | .................... PCT/SE00/01667 |

(51) Int. Cl.
*G09G 5/00* (2006.01)

(52) U.S. Cl. .................... 345/179; 345/1.1; 345/1.2; 235/380; 235/435

(58) Field of Classification Search .................. 345/1.1, 345/1.2, 2.1, 2.3, 173, 179, 2.2; 178/18.03, 178/19.01, 20.01; 709/212, 213, 214, 215; 235/435, 494, 380
See application file for complete search history.

(56) References Cited

U.S. PATENT DOCUMENTS 4,495,646 A    1/1985    Gharachorloo ............... 382/188

(Continued)

FOREIGN PATENT DOCUMENTS

EP    0615209    9/1994

(Continued)

OTHER PUBLICATIONS

Mats-Petter Pettersson and Tomas Elsö, U.S. Appl. No. 60/157,967, filed Oct. 6, 1999.

(Continued)

*Primary Examiner*—Sumati Lefkowitz
*Assistant Examiner*—Ke Xiao
(74) *Attorney, Agent, or Firm*—Birch, Stewart, Kolasch & Birch, LLP.

(57) ABSTRACT

A system for information management comprises a central unit and a plurality of user units which are arranged to record information and send the information to the central unit. Particulars are stored in the central unit about a plurality of regions, each of which represents an area on at least one imaginary surface. One of the user units records information which comprises at least two coordinates and sends the information to the central unit. When the central unit receives the information from the user unit, it identifies to which region the coordinates belong and determines how the information is to be managed, based on the region affiliation.

42 Claims, 3 Drawing Sheets

U.S. PATENT DOCUMENTS

| | | | |
|---|---|---|---|
| 5,012,049 A | 4/1991 | Schier | 178/19.06 |
| 5,051,736 A | 9/1991 | Bennett et al. | 345/180 |
| 5,442,147 A | 8/1995 | Burns et al. | 178/18.09 |
| 5,449,896 A * | 9/1995 | Hecht et al. | 235/494 |
| 5,477,012 A | 12/1995 | Sekendur | 178/18.09 |
| 5,515,491 A * | 5/1996 | Bates et al. | 715/754 |
| 5,652,412 A | 7/1997 | Lazzouni et al. | 178/18.01 |
| 5,661,506 A | 8/1997 | Lazzouni et al. | |
| 5,790,105 A | 8/1998 | Yoshikawa | 345/173 |
| 5,842,196 A | 11/1998 | Agarwal et al. | 707/2 |
| 5,852,434 A * | 12/1998 | Sekendur | 345/179 |
| 5,932,863 A | 8/1999 | Rathus et al. | 235/462.1 |
| 5,937,110 A | 8/1999 | Petrie et al. | |
| 5,983,277 A * | 11/1999 | Heile et al. | 709/232 |
| 6,330,976 B1 | 12/2001 | Dymetman et al. | |
| 6,345,304 B1 | 2/2002 | Dymetman et al. | |
| 6,502,756 B1 | 1/2003 | Fahraeus | |
| 6,564,252 B1 * | 5/2003 | Hickman et al. | 709/214 |
| 2003/0089781 A1 | 5/2003 | Kia et al. | |

FOREIGN PATENT DOCUMENTS

| | | |
|---|---|---|
| GB | 2306669 | 5/1997 |
| WO | WO 99 50751 | 10/1999 |
| WO | WO 99 50787 | 10/1999 |
| WO | WO0000928 | 1/2000 |
| WO | WO0031682 | 6/2000 |
| WO | WO0073983 | 12/2000 |
| WO | WO0126032 | 4/2001 |

OTHER PUBLICATIONS

XP002328425: Dymetman and Copperman, Intelligent Paper, Xerox Research Center Europe; published in Apr. 1998.

* cited by examiner

CENTRALIZED INFORMATION MANAGEMENT BASED UPON POSITION INFORMATION

CROSS REFERENCE TO RELATED APPLICATION

This application claims the benefit of U.S. Provisional Application No. 60/177,310, filed Jan. 21, 2000; U.S. Provisional Application No. 60/208,164, filed May 31, 2000; U.S. Provisional Application No. 60/208,169, filed May 31, 2000; U.S. Provisional Application No. 60/208,170, filed May 31, 2000; U.S. Provisional Application No. 60/210,654, filed Jun. 9, 2000; and and U.S. Application No. 09/652,838, filed Aug. 30, 2000.

FIELD OF THE INVENTION

This invention relates to the field of management and communication of information.

BACKGROUND OF THE INVENTION

Information is often written down and communicated by means of pen and paper. Such paper-based information is, however, difficult to manage and communicate efficiently.

Computers are used to an increasing extent for managing and communicating information. The information is entered by means of a keyboard and stored in the computer's memory, for example on a hard disk. The entry of the information by means of the keyboard is, however, slow and it is easy to make mistakes. Nor is it particularly convenient to read large amounts of text on a computer screen. Graphical information, such as drawings or images, is often entered by means of a separate image reader, such as a scanner or the like, in a procedure which is time-consuming, cumbersome, and as often as not gives unsatisfactory results. However, once the information is in the computer, it is easy to communicate it to others, for example as an e-mail or SMS via an Internet connection or as a fax via a fax modem.

In Applicant's Patent Application PCT/SE00/01895, which claims priority from Swedish Patent Application No. 990354-2, filed on Oct. 1, 1999, and which is incorporated herein by reference, a system is described where a pen and paper are used to write down information in the traditional way, at the same time a digital graph being created consisting of several tracks or lines of the movement of the pen across the paper, which graph can be transmitted to a computer. Such a system combines the advantages of management with pen and paper, which many users are used to, with the computer's superior ability to communicate and store information. The sheet of paper is provided with a coding pattern, for example consisting of points or other symbols. The pen has a sensor, preferably optical, which records the coding pattern and, by means of a mathematical algorithm, calculates the position of the pen on the coding pattern.

In this way the traditional pen becomes an excellent input device for the computer, and the computer can be used to store the recorded information instead of the sheet of paper having to be archived in a file. In addition, the information can easily be communicated by means of the computer.

The recorded information contains parts which can be used for different purposes.

1) The digital graph contains an image, such as figures or interrelated lines, which can be interpreted by people, for example letters, a symbol, a figure or a drawing. This is the actual message which was written down and which the user wants to manage in some way, for example to archive or to send to a recipient. This information, so-called message information, is stored in some graphical format, for example a vector format or as a collection of pixels.
2) The part of the message information which consists of letters (handwritten) can be subjected to subsequent processing in the form of OCR interpretation (Optical Character Recognition) or ICR interpretation (Intelligent Character Recognition) for conversion into a character format which can be used by the computer, for example for searching purposes or for cataloguing. Symbols can also be interpreted, for example stenography symbols or icons, to which the user predefines a particular meaning. In the following, this information is called character information.
3) The information can also contain an identification of which pen was used to write down the information.
4) Finally, the graph contains information about where on the surface the graph was written down, so-called absolute position information.
5) In addition, a hard copy of the recorded information can be obtained, if the pen makes physical marks on the sheet of paper.

Prior-art technique comprises other systems for obtaining absolute or relative position information when writing on a surface. However, these previously known systems only describe the use of such information in order to create message information and/or character information, that is information belonging to the groups 1) and 2) above. Such prior-art technique includes, for example, optical detection of a position-coding pattern on a base according to U.S. Pat. Nos. 5,051,736, 5,442,147, 5,852,434, 5,652,412 and EP-B-0 615 209. Position information can also, as also described in EP-B-0 615 209, be obtained by means of acceleration sensors, or by means of inductive/capacitive/magnetic sensors. Other alternatives are a base incorporating pressure sensors, as described in U.S. Pat. No. 5,790,105, triangulation of signals (light, sound, infrared radiation, etc.) with the use of a plurality of transmitters/receivers, as described in U.S. Pat. No. 5,012,049, or mechanical detection of movement relative to a surface, as described in U.S. Pat. No. 4,495,646. Position information can also be obtained by combinations of techniques. For example, a system is described in WO 00/31682 with combined optical detection of symbols, for determination of absolute position information at low resolution, and acceleration sensors, for the determination of relative position information at high resolution.

Although, according to known prior art, there are several different techniques for recording message and/or character information as described above, there is no system for enabling the user to manage this information in a simple, flexible and structured way.

Known systems for managing information, such as the database system as described in U.S. Pat. No. 5,842,196, comprise as a rule a central server unit and user units in the form of personal computers or terminals, which communicate with the server unit. The server unit contains a database with information stored in data records. Searching these data records and updating the same with new information are time-consuming operations which should be made as efficient as possible. For this reason the data-base is often organized in a tree structure, in which the data records, or data fields in these, are given search indices or key values. It is, however, unclear how this type of database system could be combined successfully with the techniques for recording message and/or character information described above.

U.S. Pat. No. 5,932,863 describes a technique for improving the user interface to electronic media. Paper products are provided with a machine-readable symbol, which is allocated a pre-programmed command in a computer. When a user inputs in the symbol by means of a hand-held scanner, this is transmitted to the computer, where the pre-programmed command is executed, for example to cause the computer to retrieve interactive software from a central data bank and to execute this in the computer. Also in this case, it is unclear how this type of user interface could be combined with the above techniques for recording message and/or character information.

SUMMARY OF THE INVENTION

This invention relates to improving the management of information which is recorded by means of a user unit. More specifically, it is an object of this invention to increase the possibilities of managing digitally-recorded information.

It is also desirable to provide a technique for information management that is easy for the user to use.

A further object is to provide a technique which enables rapid, simple and unambiguous management of information.

It is also an object to provide a technique which is general, but which permits individual management of different parties' information.

According to a first aspect of this invention, more specifically a system is provided for information management, which system comprises a central unit and a plurality of user units which are arranged to record information and send the information to the central unit. Particulars or data are stored in the central unit about a plurality of regions, each of which represents an area on at least one imaginary surface. Each of the user units is arranged to record information which comprises at least one position on the imaginary surface and to send the information to the central unit. The central unit is arranged, in response to the receipt of the information from a user unit, to identify to which region the position or positions belong, and to determine how the information is to be managed based on the region affiliation.

Thus, according to the invention, at least one imaginary surface is used which is divided into different regions in order to control the information management. Information in the system is channeled via a central unit which identifies to what region the information belongs and accordingly how it is to be managed. Different parties with different needs can have access to different regions in the system and can control how their own information is to be managed by defining rules which are associated with their region. The system is thus general, but permits individual management of different parties' information.

For the user the system is coherent, transparent and simple to use, as the information is sent to one and the same place, that is the central unit, and as the user does not need to define himself how the information is to be managed. This is controlled instead by the coordinates which the user records using the user unit.

Each position is suitably given by two coordinates, which make it possible to determine a point on the imaginary surface and hence the region affiliation. The coordinates can be sent to the central unit in some form that requires processing in order for the region affiliation to be determined. The information which is sent to the central unit can contain the coordinates for more than one position. It can also contain more than two coordinates which define a position. For example, if there are several imaginary surfaces, a third coordinate can be used to define which imaginary surface is involved.

The combination of the use of regions to control how the information is to be dealt with and positions to define the region affiliation is particularly advantageous as many people still prefer to write short messages and the like by hand and as positions can also be used to define or describe information which is written or drawn by hand.

The information can be recorded by all types of user units which make possible simultaneous recording of positions, for example any of the techniques described by way of introduction, provided that they are capable of, or can be modified for, recording information which comprises positions on an imaginary surface, which is imaginary in so much as it is never present in its entirety on a base or a product. It is, however, particularly preferable to use a user unit, typically shaped like a pen, which enables continual recording of the position of the user unit on a surface to be carried out by reading off a position-coding pattern on the surface. By means of such continual recording of the position of the user unit when this is used to write for example text, the written text can be recorded electronically in the form of coordinates for the position of the pen on the sheet of paper. Such a technique is described, for example, in the above-mentioned Patent Application PCT/SE00/01895, and in U.S. Pat. No. 5,852,434. In this case the position-coding pattern defines the imaginary surface, which consists of all the positions whose absolute coordinates the position-coding pattern has the capacity to code.

The user unit can thus be a digital pen which can be used to write ordinary pigment-based information on a sheet of paper, which information is recorded digitally in the user unit at the same time. Alternatively, the user unit can be some other hand-held electronic device, by means of which information can be recorded, for example a PDA with a pressure-sensitive screen. In this example the information can be recorded by a user writing information on the screen and by the position information being generated on the basis of where on the screen pressure is applied. The position of the user unit can alternatively be recorded by some other of the techniques for recording position information described by way of introduction.

In an advantageous embodiment of the system, particulars are stored in the central unit for each of said regions concerning an owner of the region. Different parties can thus lease, license or in some other way acquire the sole right to one or more regions on the imaginary surface and in this way create their own individual system for management of information within the framework of the general system and with a uniform interface to the user.

As mentioned, there can be rules for each region for how information which is identified as belonging to that region is to be treated. These rules are advantageously stored in the central unit so that the central unit has access to them directly when the region affiliation of received information has been determined. The rules can be of all types and of varying complexity.

In an advantageous embodiment, the central unit is arranged to send the information which is received from the user unit to a recipient. The recipient can be the owner of a region or some other recipient, whose address is associated with the region. The recipient can also be a final recipient or an intermediary recipient, who in turn forwards the information to the final recipient.

The recipient can also be one of said user units, for example the user unit from which the central unit received the information. Then user-generated information can be sent from the user unit to the central unit, processed in some required way which is controlled by the region affiliation and sent back to the user unit. This makes possible more advanced information processing than that which can be carried out in the user unit itself. This also makes possible updating of software or stored information in the user unit in a simple way, by the central unit being caused to send back updating information to the user unit on the basis of received position information.

The recipient can, for example, be specified in the information generated by the user or can be associated with a user identity. In an advantageous embodiment, the recipient can also be defined by means of the region affiliation. There can be one or more recipients for a region. In the latter case each recipient can be associated with a subset of a region.

The information can be forwarded in various forms, for example electronic or physical, and by different means, such as via a computer network, a telephone network, etc. This can also be controlled by the region affiliation.

In one embodiment, the central unit can be arranged to attach a data packet to the information to the recipient, for example a document or program file, which is defined by the region affiliation. This can be relevant in the case where an owner of a region uses the information management system to distribute information about his products to his customers. The owner then marks his products with coordinates which are associated with the region. A user records the coordinates with a user unit which sends them to the central unit in the form of one or more positions. As a result of the identification of the region, the central unit sends a file with information about the product to the user.

In another embodiment, the central unit can be arranged to store the information which is received from the user unit in a location which is indicated by the region affiliation. An example of an application is that a user writes notes which are to be stored in the central unit, or in some location in the network which contains the central unit, in such a way that they are accessible to others. The region which is defined by the coordinates in the information from the user is then allocated particulars about a storage location.

The central unit can be arranged to process the information which is received for the user unit, for example before it is sent to the recipient, in a way which is defined by the region affiliation. The processing can, for example, consist of refining the information and/or supplementing the information and/or checking the information. The supplementing can, for example, consist of said attachment of a document file.

A party can thus define what processing is to be carried out of the information which is associated with his region. This processing is implemented in the central unit and does not need to be implemented in the party's own system. If several parties require similar functions, synergy can be achieved.

As mentioned, by using the user unit a user can write characters which are recorded by means of the user unit in the form of coordinates for the positions of the user unit on the sheet of paper. In this case the information which is sent to the central unit will contain considerably more positions than the one which is required in order to determine the region affiliation. The central unit can, in the case of the information comprising handwritten text, be arranged to convert the received positions into at least one character in character-coded format.

If the interpretation of the information which is generated by the user unit is carried out in the central unit instead of in the user unit, much more powerful character interpreters can be used (for example, ICR software) than what is currently economically viable to use in each individual user unit. In addition, it is easier to upgrade the character interpreters in the central unit than in each individual user unit.

As an alternative to machine character interpretation, manual character interpretation can be carried out.

Each user unit has advantageously a pen point. When the user writes with the user unit, both a paper copy and an electronic description of what was written are obtained. The user unit can, however, be used exclusively for electronic recording of positions.

The functions described above which are carried out by the central unit are achieved preferably by means of suitable software in the central unit.

The user unit has suitably a unique user identity, where the user unit is arranged to include the user identity in the information to the central unit. The unique identity can, for example, be a serial number or some form of code which has been stored in the user unit specifically for this purpose. The user identity can be used by the central unit or by a region owner to identify the sender of the information, for example, when a reply is to be sent back to the sender.

As shown above, the system advantageously comprises a plurality of products from which said coordinates are recorded. The products can be any products which can be provided with coordinates which can be recorded by a user unit. Examples of such products are forms, brochures, newspapers, etc, of paper or plastic material, a writing board of plastic material or a display screen. Products that are particularly suitable for being provided with coordinates are all forms of products with writing surfaces.

In an advantageous embodiment, a subset of a position-coding pattern, which codes a large number of positions on said imaginary surface, is reproduced on each of said products, the coordinates which are recorded by the user unit being coordinates for positions on the imaginary surface and being recorded by means of the subset of the position-coding pattern on the product. The subset is situated preferably within a region. Figuratively, it can be regarded as cutting out a subset or a partial area of the position-coding pattern and placing it on the product. This partial area codes at least one position on the imaginary surface. By reading off the position-coding pattern in the partial area, the coordinates can be determined for one or more positions within the partial area, and by means of these positions the region affiliation can then be determined and hence how the information which is sent to the central unit is to be managed. The partial area preferably codes several positions on the imaginary surface, so that characters can be written on the partial area and recorded digitally. From the above, it can be seen that the imaginary surface can be considered to consist of all the positions whose coordinates the position-coding pattern has the capacity to code.

The position-coding pattern can advantageously be constructed of symbols and each point on said imaginary surface can be coded by a predetermined number of symbols. Each user unit is thus arranged so that, when it is moved across said partial area to generate the information, the symbols are continually recorded locally within its field of vision, to provide a description of the movement in the form of coordinates.

The user unit must thus in each position on the partial area be able to record as many symbols as are required to identify a point in the form of its coordinates. When the user unit is moved across the surface, it identifies a sequence of pairs of coordinates which together describe how the user unit has been moved and thus the information that the user unit generates when it is moved.

The user unit can send the recorded symbols direct to the central unit. In this case, position information is received in coded form. As a preferred alternative, the user unit can determine which coordinates that correspond to the symbols before the information is sent to the central unit. The user unit preferably also compresses the description of the movement of the user unit, for example by only including certain of the positions in the information to the central unit, for example by conversion of a sequence of pairs of coordinates to a polygon train.

According to a second aspect of the invention, this relates to a central unit, which is arranged to be incorporated in a system for information management. The central unit has a memory in which particulars are stored about a plurality of regions, each of which corresponds to an area on at least one imaginary surface. The central unit is also arranged, in response to the receipt of information which contains at least one position on the imaginary surface, to determine to which region the position or positions belong and to determine from the region affiliation how the information is to be managed.

According to a third aspect of the invention, this relates to a method for managing information which is recorded by means of a user unit. In the method, the user unit records information in such a way that it comprises at least one position and sends said information to a central unit which contains particulars about a plurality of regions, each of which represents an area on at least one imaginary surface. In response to the receipt of the information from the user unit, the central unit identifies to which region the position or positions belong and determines from the region affiliation how the information is to be managed.

According to a fourth aspect of the invention, this relates to a storage medium for digital information, which can be read by a computer system. The storage medium contains a computer program which comprises instructions for causing a processor to determine, in response to the receipt of information which contains at least one position on an imaginary surface, to which region on the imaginary surface the position or positions belong, and to determine from the region affiliation how the information is to be managed.

The advantages of the central unit, the method and the storage medium will be apparent from the discussion of the system. The characteristics which are mentioned for the system are, of course, also applicable to the central unit, the method and the storage medium.

According to a fourth aspect of the invention, this relates to a user unit for recording information, which user unit is arranged to record at least two coordinates which together define a position, to determine whether the coordinates represent a point in a first or a second area on an imaginary surface and to send a message, which comprises said at least two coordinates, to a predetermined external unit if the point belongs to the first area.

This user unit utilizes the same principle as described above, namely that the information management is controlled by means of different partial areas on an imaginary surface. In a user unit this can be utilized, for example, to ensure that certain information is automatically forwarded to a central unit, while other information is processed locally in the user unit.

BRIEF DESCRIPTION OF THE DRAWINGS

This invention and its characteristics, objects and advantages will be described in greater detail in the following with reference to the accompanying drawings, which for the purpose of exemplification show currently preferred embodiments.

DESCRIPTION OF PREFERRED EMBODIMENTS

By way of introduction, a system for information management according to the invention will be described in general terms, with reference to FIG. 1. Thereafter parts of the system will be described in greater detail, with reference to FIGS. 1-3.

General Structure and Function

Figure 1:
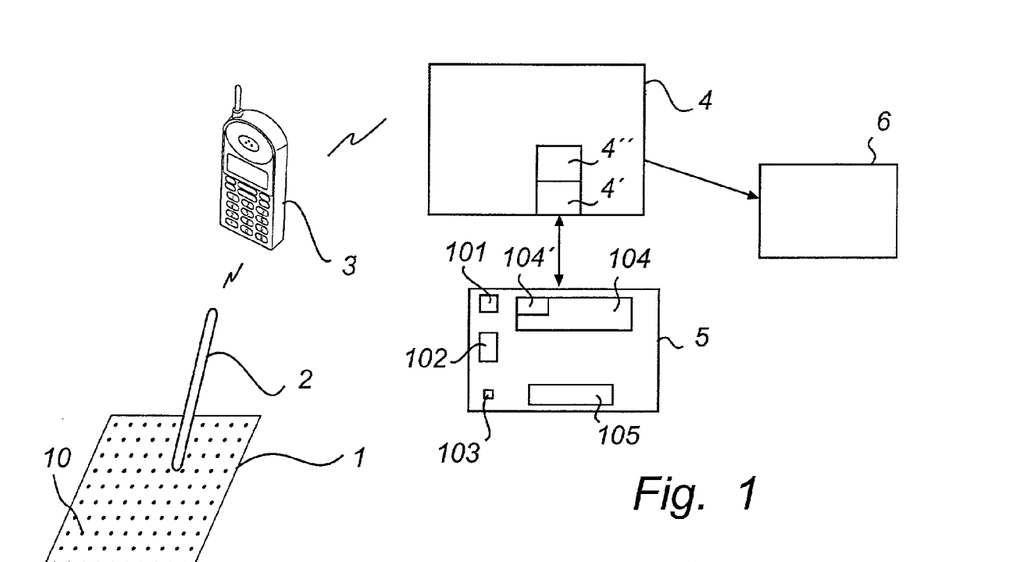
FIG. 1 is a schematic view of a system according to an embodiment of this invention.

FIG. 1 shows an example of how a system according to the invention can be constructed. The system comprises principally a plurality of products, a plurality of user units, a plurality of network connection units and at least one central unit. For the sake of clarity, however, only one product 1, one user unit 2, one network connection unit 3 and one central unit 4 are shown in FIG. 1.

The system makes possible structured management of information which a user records on a product 1 by means of a user unit 2. The product 1 is provided with a coding pattern which is interpreted by the user unit 2 as absolute coordinates on the surface of the product 1. The coding pattern is such that it codes positions on a total surface 5 which is much larger than the surface of the product 1. When the user moves the user unit 2 across the surface of the product 1, information is recorded containing one or more pairs of absolute coordinates. This recorded information is communicated, automatically or upon command, via the network connection unit 3 to the central unit 4. The central unit 4, whose memory 4' stores particulars about the total surface 5 and its division, contains software which causes a processor 4" to process the received information based on from where on the total surface 5 the information has been recorded, that is based on the coordinate content of the received information. The central unit 4 can also be designed to forward the information to a recipient 6 as part of the processing.

This system permits structured management of information. Different parties with different needs can have access to different parts of the total surface 5 and control how their own information is to be managed. The system is general but also permits individual management of different parties' information.

For the user, the system is coherent, transparent and simple to use as the information is sent to one and the same place, that is the central unit 4, and as the user does not himself need to define how the information is to be managed. This is controlled instead by the coordinates that the user records by means of the user unit 2.

The Product

The product 1 can be any product which can be provided with coordinates so that these can be read off by the user unit 2. The coordinates can be given in explicit or in coded form. The coordinates are preferably arranged on a writing surface on the product 1, which can be of any material, such as paper, plastic, etc. The coordinates can also be integrated in or arranged upon a computer screen. In this way a screen is achieved with the same function as a touch screen, but with the advantages that it is unaffected by the environment and that the screen can be bent. The coordinates can alternatively be displayed electronically on a computer screen or some other display screen.

In this example, however, the product 1 consists of a sheet of paper which is provided across its whole surface with a position-coding pattern 10 which is shown very simplified and enlarged as a number of dots on the sheet of paper. The position-coding pattern 10 on the product 1 constitutes a subset of a larger position-coding pattern.

The Position-Coding Pattern

The position-coding pattern can be constructed in various ways, but has the general characteristic that if any part of the pattern of a particular minimum size is recorded, then the position thereof in the position-coding pattern and thus on the sheet of paper can be determined unambiguously.

The position-coding pattern can be of the type which is shown in the above-mentioned U.S. Pat. No. 5,852,434, where each position is coded by a specific symbol.

It is, however, desirable for the position-coding pattern to be used to record information at a high resolution and in addition to be used in a system which permits varied processing of the information. Therefore the pattern should be designed in such a way that it can code a very large number of positions, given by absolute coordinates, at high resolution. In addition, the position-coding pattern should be coded graphically in such a way that it does not dominate or interfere with the visual impression of the surface of the product. It should also be possible to detect the position-coding pattern with high reliability.

Therefore the position-coding pattern is advantageously of the type which is shown in the published International Patent Application WO 00/73983 filed on 26 May 2000, or in the International Patent Application PCT/SE00/01895 filed on 2 Oct. 2000, both of which applications are assigned to the present Applicant. In these patterns each position is coded by a plurality of marks or symbols, and each symbol contributes to the coding of several positions. The position-coding pattern is constructed of a small number of types of symbols.

An example is shown in WO 00/73983 where a larger dot represents a "one" and a smaller dot represents a "zero".

The currently most preferred pattern is shown in PCT/SE00/01895, where four different displacements of a dot or mark in relation to a raster point code four different values. This pattern is constructed of extremely small dots at a nominal spacing of 0.3 mm. Any part of the pattern which contains 6×6 such dots defines a pair of absolute coordinates. Each pair of absolute coordinates is thus defined by a 1.8 mm×1.8 mm subset of the position-coding pattern. By means of determination of the position of the 6×6 dots on the sensor in the user unit which is used to read off the pattern, an absolute position on the imaginary surface can be calculated by interpolation with a resolution of 0.03 mm. A more complete description of the position-coding pattern according to PCT/SE00/01895 is given in the following Appendix.

This position-coding pattern is able to code a large number of absolute positions. As each position is coded by 6×6 dots, each of which can have one of four values, $4^{36}$ positions can be coded, which with the above-mentioned nominal distance between the dots corresponds to a surface of 4.6 million $km^2$.

The position-coding pattern can be printed on any base which is capable of a resolution of approximately 600 dpi. The base can be any size and shape, depending upon its planned use. The pattern can be printed by standard offset printing technology. Ordinary black carbon-based printing ink or some other printing ink which absorbs infrared light can advantageously be used. This means that other inks, including black ink which is not carbon-based and which does not absorb infrared light, can be used to superimpose other printing on the position-coding pattern without interfering with the reading off of this.

A surface which is provided with the above-mentioned pattern printed with a carbon-based black printing ink will be perceived by the eye as only a pale gray shading of the surface (1-3% density), which is user-friendly and esthetically pleasing.

Of course, fewer or more symbols can be used to define a position than as described above, and larger or smaller distances between the symbols can be used in the pattern. The examples are only given to show a currently preferred realization of the pattern.

The User Unit

Figure 2:
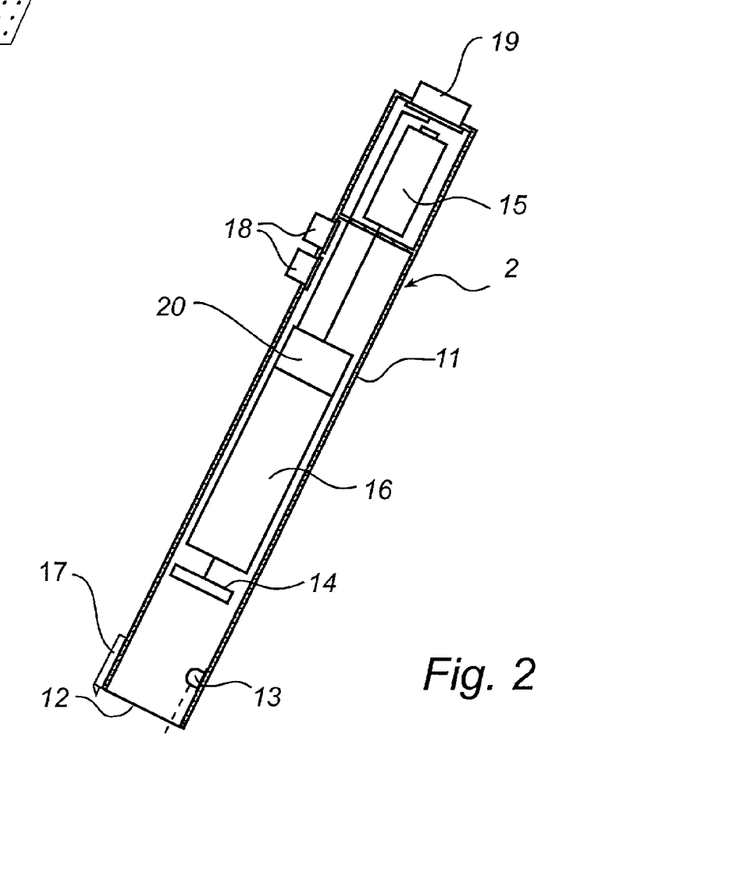
FIG. 2 is a schematic internal view of a user unit.

FIG. 2 shows an example of a user unit 2. The user unit 2 comprises a casing 11 which is the same shape as a pen. A short side of the casing has an opening 12 and is intended to be held in contact with or a short distance from a base provided with a position-coding pattern.

The user unit, below called a digital pen, contains essentially an optics part, an electronic circuitry part and a power supply.

The optics part forms a digital camera and comprises at least one infrared light-emitting diode 13 for illuminating the surface which is to be imaged and a light-sensitive area sensor 14, for example a CCD or CMOS sensor, for recording a two-dimensional image. The user unit may also contain a lens system (not shown). The infrared light is absorbed by the symbols in the position-coding pattern and in this way makes them visible to the sensor 14. The sensor records advantageously at least 100 images per second.

In the embodiment shown, the power supply for the pen is obtained from a battery 15 which is mounted in a separate compartment in the casing. Alternatively, however, the pen can be connected to an external power source.

The electronic circuitry part comprises a signal processor 16 for determining a position on the basis of the image recorded by the sensor 14 and more specifically a processor unit with a microprocessor which is programmed to record images from the sensor, identify symbols in the image and to determine in real time absolute coordinates for positions on the imaginary surface on the basis of the imaged subset of the position-coding pattern. In an alternative embodiment, the signal processor 16 is realized as an ASIC (Application Specific Integrated Circuit) or an FPGA (Field Programmable Gate Array).

The position determination is thus carried out by the signal processor 16 which thus must have software to enable it to locate and decode the symbols in an image and to enable it to determine positions from the codes thus obtained. A person skilled in the art would be able to design such software from the description in the above-mentioned Patent Application PCT/SE00/01895.

The signal processor 16 is also programmed to analyze stored pairs of coordinates and to convert these into a polygon train which constitutes a description of how the user unit 2 has been moved across the surface which is provided with the position-coding pattern. Finally, the signal processor 16 is programmed to generate, automatically or upon command, a message which contains the polygon train and a unique user identity which is stored in the user unit and to send this information to the central unit 4. The signal processor 16 does not need to forward all the information to the central unit 4.

The signal processor 16 can be programmed to analyze the recorded coordinates and only to forward information which is represented by coordinates within a particular coordinate area. The signal processor 16 can also have software for encrypting the information which is sent to the central unit 4.

The digital pen 2 comprises in this embodiment a pen point 17, using which the user can carry out ordinary pigment-based writing on the surface provided with the position-coding pattern. The pen point 17 can be extended and retracted so that the user can control whether or not it is to be used. A button (not shown) for extending and retracting the pen point, in the same way as in an ordinary ball-point pen, can also function as an on/off button for the pen, so that the pen is activated when the pen point is extended.

The pen 2 is arranged to transmit information which is generated by the user to the central unit 4. In the example according to FIG. 1, the information is transmitted wirelessly to the network connection unit 3, which in turn transmits the information to the central unit 4. In this example, the network connection unit is a mobile telephone 3. It can alternatively be a computer or some other suitable unit which has an interface to a network, for example the Internet, a local company network, or a telephone network. The network connection unit 3 can alternatively constitute an integrated part of the pen 2.

All the recorded data can be stored in a buffer memory 20 awaiting transmission to the central unit 4. As a result, the pen 2 can work in stand-alone mode, that is the pen 2 sends the information when it has the opportunity, for example when it makes contact with the network connection unit 3, whereupon it retrieves recorded information from the buffer memory 20.

The communication between the pen 2 and the network connection unit 3, which are normally located fairly close to each other, can be carried out via infrared radiation or radio waves, for example in accordance with the Bluetooth® technology, or some other technology for the transfer of information across short distances. For this purpose the pen 2 has a transceiver 19 for wireless communication with external units, preferably a Bluetooth® transceiver.

Alternatively, the transmission can be via cables. For example, the user unit 2 can be connected via a cable to the network connection unit 3. Alternatively, the network connection unit 3 can be designed as a docking unit (not shown) which can be connected via cables to a communication network, such as a telephone network or a computer network. Such a docking unit can advantageously be designed as a pen stand. When the user unit 2 is placed in the docking unit, the user unit 2 is caused, automatically or upon command, to communicate with the central unit 4. The docking unit can also be designed to charge the battery 15 (FIG. 2) in the user unit 2. According to another alternative, the docking unit is designed to establish a wireless connection with the outside world.

The above example is only given to show a currently preferred implementation of the user unit. In an alternative embodiment, the user unit operates only as an image generator, that is the images recorded by the sensor 14 are transmitted to a computer (not shown), which processes the images to determine the coordinates as above, and which communicates with the central unit 4 via a suitably incorporated network connection.

In the embodiment above, the pattern is optically readable and the sensor 14 is thus optical. The pattern can, however, be based on a parameter other than an optical parameter. In such a case the sensor must of course be of a type which can read the parameter concerned. Examples of such parameters are chemical, acoustic or electromagnetic marks. Capacitive or inductive marks can also be used. However, it is preferable for the pattern to be optically readable as it is then relatively simple to apply it onto different products and in particular onto paper.

The Central Unit

The central unit 4 in FIG. 1 is a computer in a network of computers. It can be constructed as a traditional server unit with one or more processors, memory of various kinds, peripherals and connections to other computers in the network, but it has new software in order to be able to carry out the functions described here. It also has information stored in its memory 4' in order to be able to handle these functions. The central unit 4 can alternatively be some other type of network-connected computer or a local computer, with which the user unit 2 communicates wirelessly or by cables.

As shown above, several user units 2 can be arranged to send their information to the central unit 4 which is thus a central part of the system. Several such systems can, however, together form an even larger system.

The central unit 4 does not need to be incorporated in a global network, but can be incorporated in a local network and can be used to manage information, for example within a company.

The central unit's 4 memory 4' comprises a database with information about the total surface 5 of positions that the position-coding pattern is able to code. The total surface 5 forms an imaginary surface which can be said to be a surface in a coordinate system, which surface thus contains a large number of positions which are systematically arranged in two dimensions with a particular specified resolution. This can also be expressed by saying that the total surface is made up of all the points or positions which the position-coding pattern has the capacity to code. Each position can be defined by two associated coordinates which form a pair of coordinates. If there is more than one imaginary surface, more than two coordinates can be required in order to define a position.

Five coordinate areas or main regions 101-105 are defined on the imaginary surface 5 in FIG. 1. The main regions 101-105 are different sizes and different shapes. They are at varying distances from each other and do not overlap.

The relationship between the size of the main regions 101-105 and the size of the imaginary surface 5 can be completely different to the one shown. The smallest possible region consists of a single position on the surface 5. The whole surface 5 does not need to be divided into regions. The regions can also be some other shape instead of the rectangular shape which is shown. Nor do the regions need to be separated from each other, but can overlap each other and be defined by mathematical relations or associations.

The different main regions 101-105 are dedicated to different types of information management. In FIG. 1 the first main region 101 can be dedicated to electronic information gathering for a transport company, the second main region 102 can be dedicated to managing electronic picture postcards for a distribution company, the third main region 103 can be dedicated to distribution of product information to a buyer of a particular product, the fourth main region 104 can be dedicated to recording handwritten information which is always to be forwarded to a predetermined server unit on the Internet and the fifth main region 105 can be dedicated to sending of graphical e-mail, SMS, fax or the like. The use of these regions will be discussed in greater detail later, in connection with a number of examples of applications.

As mentioned, particulars are stored in the central unit's 4 memory 4' about the extent of the imaginary surface 5, and the position and extent of the main regions 101-105 which have been dedicated to different types of information management. A rectangular region can, for example, be defined by means of two pairs of coordinates which represent the corners of the region.

Particulars or rules for each main region 101-105 are to be found in a data structure in the central unit's 4 memory 4', which information or rules define how the information which can be allocated to the main regions is to be processed.

Figure 3:
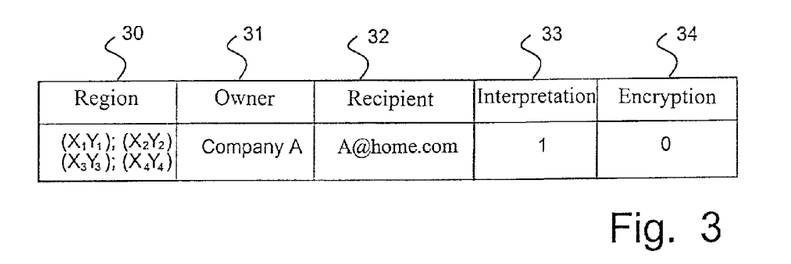
FIG. 3 is a schematic diagram of a storage structure for region-based rules for information processing.

FIG. 3 shows an example of such a structure, which consists here of a table. In a first column 30 in the table, the regions on the imaginary surface are defined by means of the coordinates (x1, y1; x2, y2; x3, y3; x4, y4) for the corners of the regions. In a second column 31, an owner of the region is defined, which is here the company A. In a third column 32, a recipient of the information which is determined as being associated with the region is defined. The recipient is here the same as the owner and is stated with an e-mail address to which the information is to be sent. A fourth column 33 indicates whether the information is to be interpreted or not. In this case, interpretation is to be carried out, as a "one" is specified in the column. In a fifth and final column, it is defined whether the information is to be sent encrypted or not. In this case the zero in the column indicates that this is not to be carried out.

Of course, this is a very simple structure which is only used to illustrate the principles. Considerably more complex structures and rules for information management can of course be used.

The Function of the System

In this embodiment the function of the system is as follows. A user writes information on the sheet of paper 1 using the user unit 2. The information is recorded electronically at the same time as it is being written, by the user unit 2 continually recording the part of the position-coding pattern which is within the field of view of the area sensor 14 during the writing. The signal processor 16 converts the position-coding pattern into absolute coordinates. The signal processor 16 thus generates a sequence of pairs of coordinates which describes how the user has moved the user unit 2 over the sheet of paper 1 during the writing. The signal processor 16 compresses this information by converting it into a polygon train of pairs of coordinates. Thereafter the signal processor 16 generates a message which contains the polygon train. The message is transmitted via the transceiver 19 to the network connection unit 3 which in turn transmits the message to the central unit 4.

When the central unit 4 receives the message, it determines to which main region 101-105 one or more of the pairs of coordinates in the polygon train belong. Then it uses the rules associated with the main region to determine how the message is to be handled.

In order to increase the capacity of the system to manage information, this can comprise several central units 4, each of which contains particulars about at least one part of the imaginary surface 5. In this case, however, each user unit 2 must know, or be able to obtain information about, to which of the central units the recorded information is to be sent. For this purpose the user unit's 2 memory can contain particulars about the association between central units and regions on the imaginary surface 5. The user unit 2 is thus arranged to determine, after recording of the information, the region affiliation for at least one position, defined by a pair of coordinates, of the recorded information and based on the region affiliation to send the information to a predetermined central unit. The user unit's 2 memory can, for example, advantageously contain particulars that make it possible for the user unit to recognize that certain positions or coordinate areas on the imaginary surface represent particular operations or commands which are to be initiated and/or carried out with regard to information which has been or is to be recorded. Preferred commands which can be recognized in the user unit 2 are "send", "address" and other similar basic commands.

In the following the information management system will be illustrated by means of examples concerning service applications and also communication applications.

Examples of Service Applications

Service applications are applications where the information management is controlled via one or more predetermined servers 4 in the system. As mentioned above, the imaginary surface 5 is divided into main regions 101-105 which can be dedicated to a particular management of information. These main regions 101-105 can then be divided into subregions (not shown) to which various parties can have the sole right. In the central unit 4 which administers the main regions 101-105 it is noted which party has the right to the different subregions. Consequently a subset of the position-coding pattern can also make possible identification of an owner of the subregion within which the pattern codes positions. Alternatively, a particular party can have the right to a main region 101-105 and himself define the management of information in subregions of this main region.

In the following, examples are given with reference to the system shown in FIG. 1.

EXAMPLE 1

A transport company uses the system to collect information associated with deliveries. The transport company therefore owns a main region 101 on the imaginary surface 5. In the central unit's 4 memory 4', the transport company is stored as the owner of the main region 101. The transport company additionally defines rules for how the information which is identified as belonging to the main region 101 is to be managed.

In this example, the transport company wants the central unit 4 to interpret the information which it receives and forward it in character-coded format to the transport company's server unit 6 together with the user identities of the user units 2. The transport company provides its drivers with user units 2 and with forms 1 which are provided with position-coding patterns. When a driver delivers a package he fills in a form 1 using the pen point of the user unit 2, which continually records the position-coding pattern on the form 1 while the user writes text and ticks boxes on the form. The user unit 2 decodes the position-coding pattern, generates a sequence of pairs of coordinates which describes the movement of the user unit 2 across the form and transmits this sequence of pairs of coordinates together with the identity of the user unit 2 in a message to the driver's mobile telephone 3 which forwards the message to the central unit 4 in the system. The central unit 4 uses one or more pairs of coordinates in the message to determine to which region the message belongs. The region affiliation determines that the sequence of pairs of coordinates in the message is to be character-interpreted and forwarded in character-coded format to the transport company's server unit 6, which is also carried out. The transport company thus automatically receives a message to its server unit 6 which reflects the content of the form 1.

EXAMPLE 2

A company which sells picture postcards has access to a region 102 on the imaginary surface 5. The company sells picture postcards which look like a normal picture postcard with a picture on the front and an address and writing area on the back. The picture postcard 1 can be used as a normal picture postcard, but it is also provided with a position-coding pattern across the whole of the back. A user can then, by means of a user unit 2, write a message in the writing area and an e-mail address or the like in the address area on the back of the picture postcard. The user unit 2 records the position-coding pattern as it moves across the back of the picture postcard 1 and generates a sequence of pairs of coordinates which represents the written text. The sequence of pairs of coordinates is sent to the central unit 4 which determines the region affiliation. In this case the rules for the main region 102 indicate that the information is to be character-coded and sent to the postcard company 6 together with particulars about in which partial area of the main region 102 the information is written. The postcard company can then match the picture which belongs to the partial area concerned with the information and send it all as an e-mail message to the addressee indicated in the message. Alternatively, this can be carried out directly by the central unit 4 in the information management system.

EXAMPLE 3

A company which sells a product A uses the information system to distribute information to interested buyers of the product A. The company has the exclusive right to a main region 103 which can be fairly small, in the extreme case corresponding to only one position on the imaginary surface 5. The company marks its products with the position-coding pattern which codes the main region 103. A user who is interested in obtaining more information about the product records all or part of the position-coding pattern (in the case this represents several positions) using a user unit 2 which sends the corresponding position or positions to the central unit 4 together with the user identity of the user unit 2. In this case a rule can be associated with the main region 103 indicating that information which is recorded within the main region is simply to be forwarded to a computer 6 belonging to the owner of the region 103. In response to the receipt of the information, the owner's computer 6 sends product information to the user. The information can be sent in the form of a file which opens the owner's home page on the Internet on the user's mobile telephone or computer, or as an e-mail message. In both cases the user's address for receipt of information must either be found in the information from the user or be recorded somewhere so that it can be obtained by means of the user identity.

EXAMPLE 4

In another example, a newspaper advertisement 1 is provided with a subset of the position-coding pattern, which subset codes positions within a main region 104 on the imaginary surface 5 which is dedicated to information which is to be sent to a predetermined central unit 4. This precise subset codes positions within a special subregion 104' of the main region 104, to which subregion 104' the advertiser has acquired the sole right.

In this example, the system contains several central units 4. The user unit's 2 memory 20 contains in this case sufficient particulars about the imaginary surface to enable the user unit to identify to which central unit 4 the recorded information is to be sent.

In the case of the advertisement, a user can place an order by specifying a recipient address and ticking a "send" box in the advertisement 1 using the user unit 2. If the order requires a payment to be made, a credit card number can be stated. If the order concerns a gift to another recipient, a handwritten greeting to the recipient can be added in a writing area for free-form graphical information in the advertisement. On the other hand, if the order is for the user, no recipient address needs to be stated since an address for the user unit 2 previously stored in the central unit 4 can be used.

When the user ticks the "send" box, the user unit 2 identifies that information was recorded within the main region 104 and therefore sends the recorded information to the associated central unit 4 on the Internet. In the central unit 4 it is determined that the recorded information is situated in the subregion 104', whereupon the owner of this subregion 104' is identified. Thereafter the decoded information, optionally together with a greeting, is sent to the owner 6 who handles the delivery of the ordered goods or service.

Examples of Communication Applications

Communication applications usually require access to the Internet or the like. Loose pages, pages in a calendar, a notebook or the like can be designed as forms for the transmission of e-mail, SMS, fax or the like.

The form contains fields which are intended for the indication of address, subject and message. Address and subject are intended to be entered as block letters so that they can be converted into character-coded format and understood by other digital units which are designed for the management of information in character-coded format. The information in the message field can consist of any graphical information. The sheet is also provided with a tick box which when it is ticked causes the user unit 2 to send the information via an associated mobile telephone 3 to a particular central unit 4 in the information management system. The information also includes a user identity which identifies the user unit 2 which is being used.

The central unit 4 receives the information, whereupon it determines to which region one or more of the pairs of coordinates in the polygon train belongs. Thereafter it uses the rules associated with that region to determine how the information is to be managed. More specifically, information stated in the address and subject fields is converted into character-coded format. The information in the message field is thereafter sent via the Internet to the addressee 6 as an electronic message. A confirmation of the delivery to the addressee is sent to the mobile telephone 3 for display on its display screen.

The above-mentioned page can be provided with a subset of the position-coding pattern which codes a region 105 on the imaginary surface which is dedicated to transmission of electronic messages. Different parts of the region 105 can then represent the different fields and tick boxes.

Alternatively, the different fields and tick boxes can be provided with different subsets of the position-coding pattern which code positions within regions which are dedicated to address information, subject indication, "send" boxes, etc. The advantage of using a special subset of the position-coding pattern for the "send" box is that this universal "send" box can then be represented by the same subset each time it is used, irrespective of whether it is, for example, on a memo sheet or on an e-mail form. Another advantage is that the decoding in the pen 2 is simple, as the user unit 2 only needs to recognize that it is a "send" box that has been ticked, whereupon the user unit 2 is to send the recorded information to the central unit 4.

The above is only intended as examples of how the invention can be realized. Many modifications and variations are possible within the scope of the invention, as it is defined in the appended claims.

Appendix

In the following the description is reproduced of a preferred position-coding pattern according to the International Patent Application PCT/SE00/01895.

Figure 4:
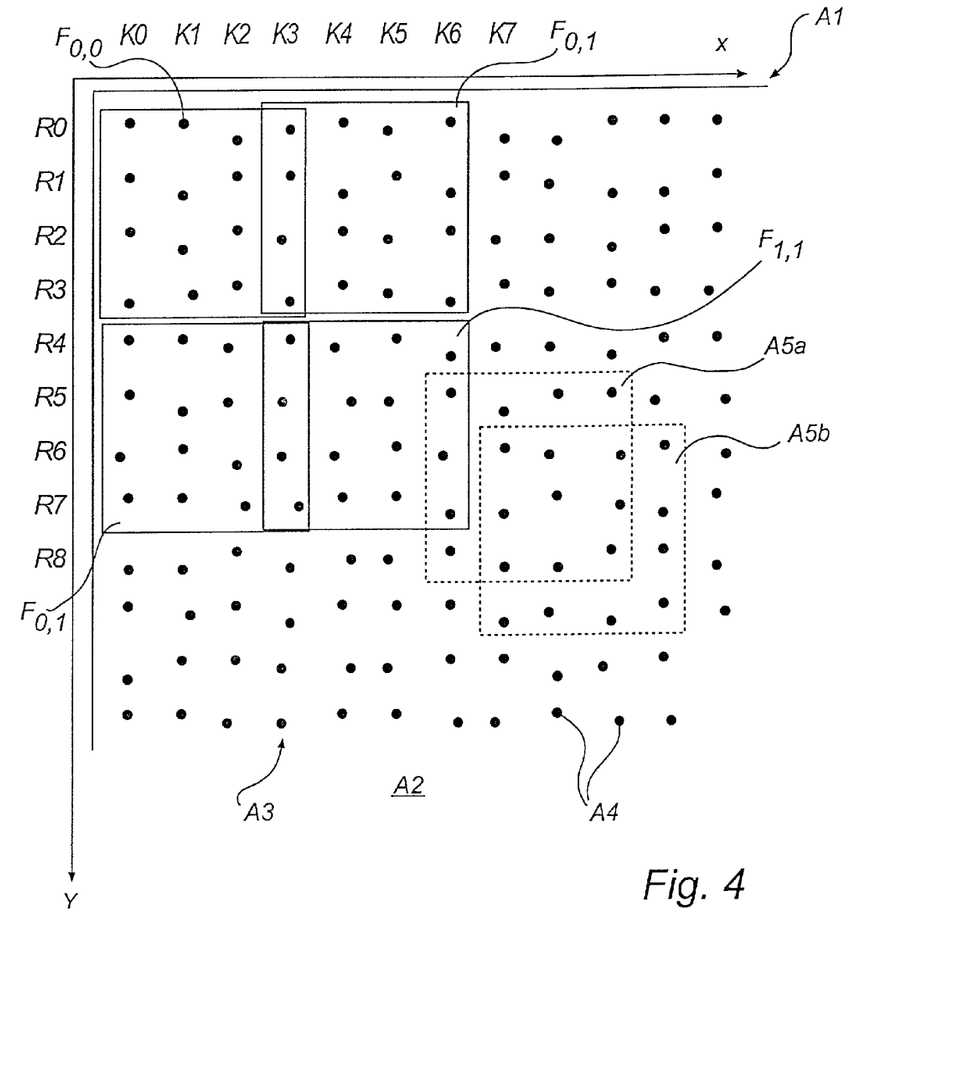
FIG. 4 is a schematic view of a product which is provided with a position-coding pattern according to a preferred embodiment.

FIG. 4 shows a part of a product in the form of a sheet of paper A1, which on at least part of its surface A2 is provided with an optically readable position-coding pattern A3 which makes possible position determination.

The position-coding pattern comprises marks A4, which are systematically arranged across the surface A2, so that it has a "patterned" appearance. The sheet of paper has an X-coordinate axis and a Y-coordinate axis. The position determination can be carried out on the whole surface of the product. In other cases the surface which enables position determination can constitute a small part of the product.

The pattern can, for example, be used to provide an electronic representation of information which is written or drawn on the surface. The electronic representation can be provided while writing on the surface with a pen, by continually determining the position of the pen on the sheet of paper by reading off the position-coding pattern.

The position-coding pattern comprises a virtual raster, which is thus neither visible to the eye nor can be detected directly by a device which is to determine positions on the surface, and a plurality of marks A4, each of which, depending upon its position, represents one of four values "1" to "4" as described below. In this connection it should be pointed out that for the sake of clarity the position-coding pattern in FIG. 4 is greatly enlarged. In addition, FIG. 4 only shows part of the sheet of paper.

The position-coding pattern is so arranged that the position of a partial surface on the total writing surface for any partial surface of a predetermined size is determined unambiguously by the marks on this partial surface. A first and a second partial surface A5a, A5b are shown by broken lines in FIG. 4. The second partial surface partly overlaps the first partial surface. The part of the position-coding pattern (here 4*4 marks) which is situated on the first partial surface A5a codes a first position, and the part of the position-coding pattern which is found on the second partial surface A5b codes a second position. The position-coding pattern is thus partly the same for the adjoining first and second positions. Such a position-coding pattern is called "floating" in this application. Each partial surface codes a specific position.

FIGS. 5a-d show how a mark can be designed and how it can be positioned relative to its nominal position A6. The nominal position A6, which can also be called a raster point, is represented by the intersection of the raster lines A8. The mark A7 has the shape of a circular dot. A mark A7 and a raster point A6 can together be said to constitute a symbol.

Figure 5:
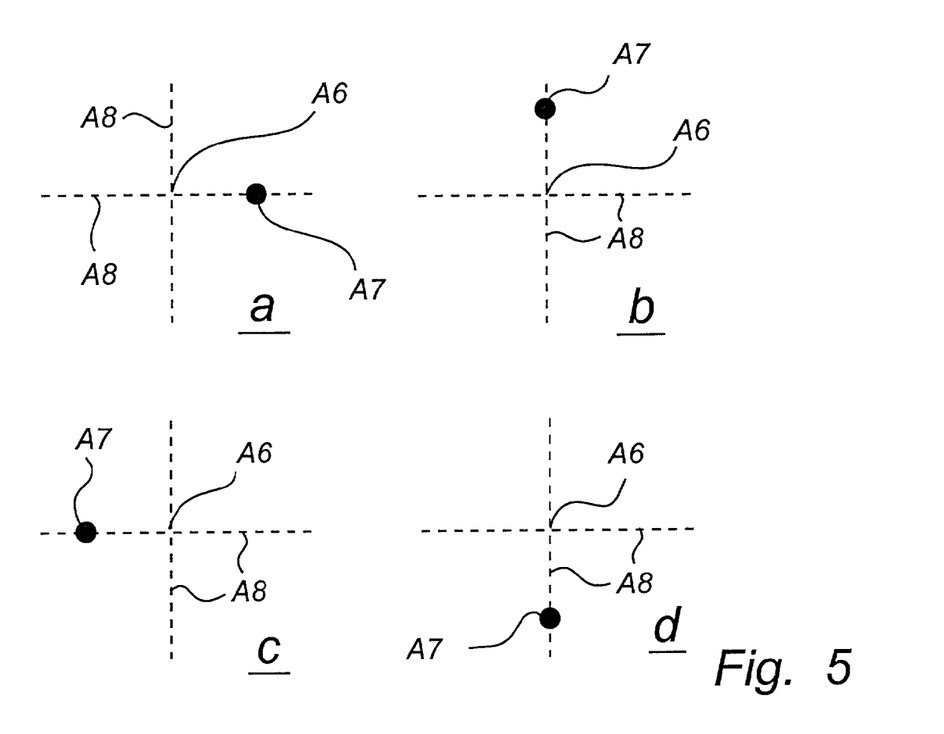
FIG. 5 is a schematic diagram that shows how the marks can be designed and positioned in a preferred embodiment of the position-coding pattern.

In one embodiment, the distance between the raster lines is 300 μm and the angle between the raster lines is 90 degrees. Other raster intervals are possible, for example 254 μm to suit printers and scanners which often have a resolution which is a multiple of 100 dpi, which corresponds to a distance between points of 25.4 mm/100, that is 254 μm.

The value of the mark thus depends upon where the mark is located relative to the nominal position. In the example in FIG. 5 there are four possible locations, one on each of the raster lines extending from the nominal position. The displacement from the nominal position is the same size for all values.

Each mark A7 is displaced relative to its nominal position A6, that is no mark is located at the nominal position. In addition, there is only one mark per nominal position and this mark is displaced relative to its nominal position. This applies to the marks which make up the pattern. There can be other marks on the surface which are not part of the pattern and thus do not contribute to the coding. Such marks can be specks of dust, unintentional points or marks and intentional marks, from for example a picture or figure on the surface. Because the position of the pattern marks on the surface is so well-defined, the pattern is unaffected by such interference.

In one embodiment, the marks are displaced by 50 μm relative to the nominal positions A6 along the raster lines A8. The displacement is preferably ⅙ of the raster interval, as it is then relatively easy to determine to which nominal position a particular mark belongs. The displacement should be at least approximately ⅛ of the raster interval, otherwise it becomes difficult to determine a displacement, that is the requirement for resolution becomes great. On the other hand, the displacement should be less than approximately ¼ of the raster interval, in order for it to be possible to determine to which nominal position a mark belongs.

The displacement does not need to be along the raster line, but the marks can be positioned in separate quadrants. However, if the marks are displaced along the raster lines, the advantage is obtained that the distance between the marks has a minimum which can be used to recreate the raster lines, as described in greater detail below.

Each mark consists of a more or less circular dot with a radius which is approximately the same size as the displacement or somewhat less. The radius can be 25% to 120% of the displacement. If the radius is much larger than the displacement, it can be difficult to determine the raster lines. If the radius is too small, a greater resolution is required to record the marks.

The marks do not need to be circular or round, but any suitable shape can be used, such as square or triangular, etc.

Normally, each mark covers several pixels on a sensor chip and, in one embodiment, the center of gravity of these pixels is recorded or calculated and used in the subsequent processing. Therefore the precise shape of the mark is of minor significance. Thus relatively simple printing processes can be used, provided it can be ensured that the center of gravity of the mark has the required displacement.

In the following, the mark in FIG. 5a represents the value 1, in FIG. 5b the value 2, in FIG. 5c the value 3 and in FIG. 5d the value 4.

Each mark can thus represent one of the four values "1 to 4". This means that the position-coding pattern can be divided into a first position code for the x-coordinate and a second position code for the y-coordinate. The division is carried out as follows:

| Mark value | x-code | y-code |
| --- | --- | --- |
| 1 | 1 | 1 |
| 2 | 0 | 1 |
| 3 | 1 | 0 |
| 4 | 0 | 0 |

The value of each mark is thus converted into a first value, here bit, for the x-code and a second value, here bit, for the y-code. In this way two completely independent bit patterns are obtained by means of the pattern. Conversely, two or more bit patterns can be combined into a common pattern which is coded graphically by means of a plurality of marks in accordance with FIG. 5.

Each position is coded by means of a plurality of marks. In this example, 4*4 marks are used to code a position in two dimensions, that is an x-coordinate and a y-coordinate.

The position code is constructed by means of a number series of ones and zeros, a bit series, which has the characteristic that no four-bit-long bit sequence occurs more than once in the bit series. The bit series is cyclic, which means that the characteristic also applies when the end of the series is connected to its beginning. A four-bit sequence has thus always an unambiguously determined position number in the bit series.

The bit series can be a maximum of 16 bits long if it is to have the characteristic described above for bit sequences of four bits. In this example, however, only a seven-bit-long bit series is used, as follows:

"0 0 0 1 0 1 0".

This bit series contains seven unique bit sequences of four bits which code a position number in the series as follows:

| Position number in the series | Sequence |
| --- | --- |
| 0 | 0001 |
| 1 | 0010 |
| 2 | 0101 |
| 3 | 1010 |
| 4 | 0100 |
| 5 | 1000 |
| 6 | 0000 |

To code the x-coordinate, the bit series is written sequentially in columns over all the surface which is to be coded, where the left column $K_0$ corresponds to the x-coordinate zero (0). In one column the bit series can thus be repeated several times in succession.

The coding is based on differences or position displacements between adjacent bit series in adjacent columns. The size of the difference is determined by the position number (that is the bit sequence) in the bit series with which adjacent columns commence.

More specifically, if we take the difference $\Delta_n$ modulo seven between, on the one hand, a position number which is coded by a four-bit sequence in a first column $K_n$ and which can thus have the value 0 to 6, and, on the other hand, a position number which is coded by an adjacent four-bit sequence at a corresponding "height" in an adjacent column $K_{n+1}$, the difference will be the same regardless of where, that is at what "height", on the two columns the difference is taken. Using the difference between the position numbers for two bit sequences in two adjacent columns, it is thus possible to code an x-coordinate which is independent of and constant for all y-coordinates.

As each position on the surface is coded by a partial surface consisting of 4*4 marks in this example, there are four vertical bit sequences available and thus three differences, each with the value 0 to 6, for coding the x-coordinate.

The pattern is divided into code windows F with the characteristic that each code window consists of 4*4 marks. There are thus four horizontal bit sequences and four vertical bit sequences available, so that three differences can be created in the x-direction and four position numbers can be obtained in the y-direction. These three differences and four position numbers code the position of the partial surface in the x-direction and the y-direction. Adjacent windows in the x-direction have a common column, see FIG. 4. Thus the first code window $F_{0,0}$ contains bit sequences from the columns $K_0$, $K_1$, $K_2$, $K_3$, and bit sequences from the rows $R_0$, $R_1$, $R_2$, $R_3$. As differences are used in the x-direction, the next window diagonally in the x-direction and y-direction, the window $F_{1,1}$, contains bit sequences from the columns $K_3$, $K_4$, $K_5$, $K_6$, and the rows $R_4$, $R_5$, $R_6$, $6_7$. Considering the coding in just the x-direction, the code window can be considered to have an unlimited extent in the y-direction. Correspondingly, considering the coding in just the y-direction, the code window can be considered to have an unlimited extent in the x-direction. Such a first and second code window with unlimited extent in the y-direction and x-direction respectively together form a code window of the type shown in FIG. 4, for example $F_{0,0}$.

Each window has window coordinates $F_x$, which give the position of the window in the x-direction, and $F_y$, which give the position of the window in the y-direction. Thus the correspondence between the windows and columns is as follows:

$K_i = 3F_x$ $R_i = 4F_y$

The coding is carried out in such a way that for the three differences, one of the differences $\Delta_0$ always has the value 1 or 2, which indicates the least significant digit $S_0$ for the number which represents the position of the code window in the x-direction, and both the other differences $\Delta_1$, $\Delta_2$, have values in the range 3 to 6, which indicates the two most significant digits $S_1$, $S_2$, for the coordinate of the code window. Thus no difference can be zero for the x-coordinates, as that could result in too symmetrical a code pattern. In other words, the columns are coded so that the differences are as follows:
(3 to 6); (3 to 6); (1 to 2); (3 to 6); (3 to 6); (1 to 2); (3 to 6); (3 to 6); (1 to 2); (3 to 6); (3 to 6); ...

Each x-coordinate is thus coded by two differences $\Delta_1$, $\Delta_2$ of between 3 and 6 and a subsequent difference $\Delta_0$ which is 1 or 2. By subtracting one (1) from the least difference $\Delta_0$ and three (3) from the other differences, three digits are obtained, $S_2$, $S_1$, $S_0$, which in mixed base directly give the position number of the code window in the x-direction, from which the x-coordinate can then be determined directly, as shown in the example below. The position number of the code window is:

$S_2*(4*2) + S_1*2 + S_0*1$

Using the principle described above, it is thus possible to code code windows 0, 1, 2, ..., 31, using a position number for the code window consisting of three digits which are represented by three differences. These differences are coded by a bit pattern which is based on the number series above. The bit pattern can finally be coded graphically by means of the marks in FIG. 5.

In many cases, when a partial surface is inputted consisting of 4*4 marks, a complete position number which codes the x-coordinate will not be obtained, but parts of two position numbers, as the partial surface in many cases does not coincide with one code window but covers parts of two adjacent code windows in the x-direction. However, as the difference for the least significant digit $S_0$ of each number is always 1 or 2, a complete position number can easily be reconstructed, as it is known what digit is the least significant.

The y-coordinates are coded in accordance with approximately the same principle as that used for the x-coordinates by means of code windows. The cyclic number series, that is the same number series as is used for the x-coding, is written repeatedly in horizontal rows across the surface which is to be position coded. Precisely as for the x-coordinates, the rows are made to start in different positions, that is with different bit sequences, in the number series. For the y-coordinates, however, differences are not used, but the coordinates are coded by values which are based on the start position of the number series in each row. When the x-coordinate has been determined for a partial surface with 4*4 marks, the start positions in the number series can in fact be determined for the rows which are included in the y-code for the 4*4 marks.

In the y-code, the least significant digit $S_0$ is determined by letting this be the only digit which has a value in a particular range. In this example, one row of four starts in position 0 to 1 in the number series, in order to indicate that this row concerns the least significant digit $S_0$ in a code window, and the three other rows start in any of the positions 2 to 6 in order to indicate the other digits $S_1$ $S_2$ $S_3$ in the code window. In the y-direction there is thus a series of values as follows:

(2 to 6); (2 to 6); (2 to 6); (0 to 1); (2 to 6); (2 to 6); (2 to 6); (0 to 1); (2 to 6); . . .

Each code window is thus coded by three values between 2 and 6 and a subsequent value between 0 and 1.

If zero (0) is subtracted from the low value and two (2) from the other values, a position in the y-direction $S_3$ $S_2$ $S_1$ $S_0$ in mixed base is obtained in a corresponding way as for the x-direction, from which the position number of the code window can be determined directly, which is:

$$S_3*(5*5*2)+S_2*(5*2)+S_1*2+S_0*1$$

Using the method above, it is possible to code 4*4*2=32 position numbers in the x-direction for the code windows. Each code window comprises bit sequences from three columns, which gives 3*32=96 columns or x-coordinates. In addition, it is possible to code 5*5*5*2=250 position numbers in the y-direction for the code windows. Each such position number comprises horizontal bit sequences from 4 rows, which gives 4*250=1000 rows or y-coordinates. In total it is thus possible to code 96000 coordinate positions.

As the x-coding is based on differences, it is, however, possible to select the position in which the first number series in the first code window is to start. If it is taken into account that this first number series can start in seven different positions, it is possible to code 7*96000=672000 positions. The start position of the first number series in the first column $K_0$ can be calculated when the x- and y-coordinates have been determined. The above seven different start positions for the first series can code different pages or writing surfaces on a product.

Theoretically, a partial surface with 4*4 symbols, which each have four values, can code $4^{4*4}$ positions, that is 4,294,967,296 positions. In order to make possible floating determination of the position of a partial surface, there is thus a redundancy factor in excess of 6000 (4294967296/672000).

The redundancy consists partly in the restrictions on the size of the differences, and partly in only 7 bits out of 16 being used in the position code. This latter fact can, however, be used to determine the rotational position of the partial surface. If the next bit in the bit series is added to the four-bit sequence, a five-bit sequence is obtained. The fifth bit is obtained by reading off the adjacent bit immediately outside the partial surface which is being used. Such an additional bit is usually easily available.

The partial surface which is read off by the sensor can have four different rotational positions, rotated through 0, 90, 180 or 270 degrees relative to the code window. In those cases where the partial surface is rotated, the reading off of the code will, however, be such that the code read off will be inverted and reversed in either the x-direction or the y-direction or both, in comparison to if it had been read off at 0 degrees. This assumes, however, that a slightly different decoding of the value of the marks is used according to the table below.

| Mark value | x-code | y-code |
|---|---|---|
| 1 | 0 | 0 |
| 2 | 1 | 0 |
| 3 | 1 | 1 |
| 4 | 0 | 1 |

The above-mentioned five-bit sequence has the characteristic that it only occurs the right way round and not in inverted and reversed form in the seven-bit series. This apparent from the fact that the bit series (0 0 0 1 0 1 0) contains only two "ones". Therefore all five-bit sequences must contain at least three zeros, which after inversion (and any reversing) result in three ones, which cannot occur. Thus if a five-bit sequence is found which does not have a position number in the bit series, it can be concluded that the partial surface should probably be rotated and the new position tested.

In order to further illustrate the invention according to this embodiment, here follows a specific example which is based on the described embodiment of the position code.

Figure 6:
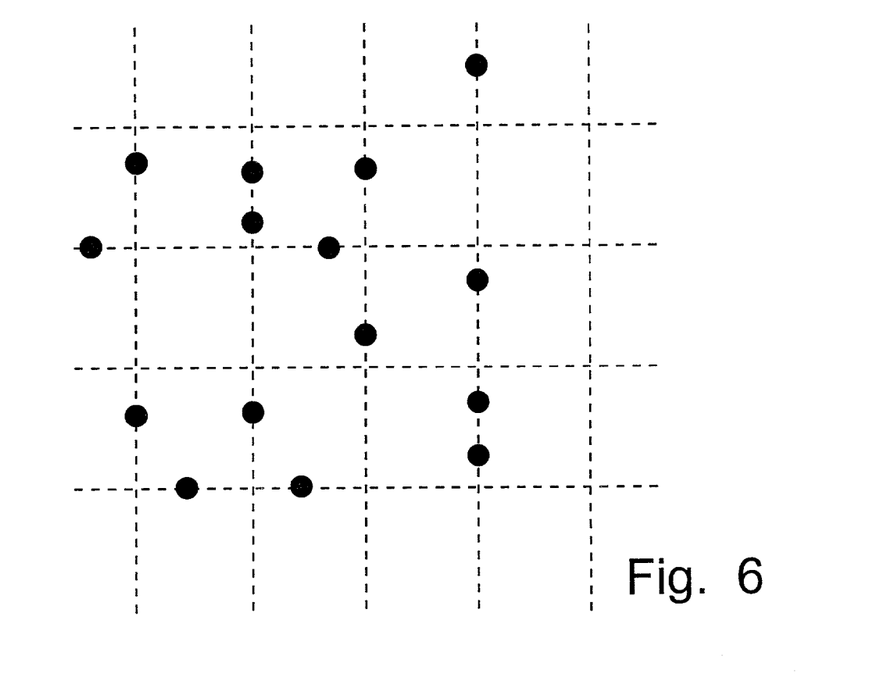
FIG. 6 is a schematic diagram that shows examples of 4*4 symbols which are used to code a position.

FIG. 6 shows an example of an image with 4*4 marks which is read off by a device for position determination.

These 4*4 marks have the following values:

| | | | |
|---|---|---|---|
| 4 | 4 | 4 | 2 |
| 3 | 2 | 3 | 4 |
| 4 | 4 | 2 | 4 |
| 1 | 3 | 2 | 4 |

These values represent the following binary x- and y-codes:

| x-code: | | | | y-code: | | | |
|---|---|---|---|---|---|---|---|
| 0 | 0 | 0 | 0 | 0 | 0 | 0 | 1 |
| 1 | 0 | 1 | 0 | 0 | 1 | 0 | 0 |
| 0 | 0 | 0 | 0 | 0 | 0 | 1 | 0 |
| 1 | 1 | 0 | 0 | 1 | 0 | 1 | 0 |

The vertical bit sequences in the x-code code the following positions in the bit series: 2 0 4 6. The differences between the columns are −2 4 2, which modulo 7 gives: 5 4 2, which in mixed base codes the position number of the code window: (5-3)*8+(4-3)*2+(2-1)=16+2+1=19. The first coded code window has the position number 0. Thus the difference which lies in the range 1 to 2 and which appears in the 4*4 marks of the partial surface is the twentieth such difference. As additionally there are in total three columns for each such difference and there is one start column, the vertical sequence furthest to the right in the 4*4 x-code belongs to the 61st column (column 60) in the x-code (3*20+1=61) and the vertical sequence furthest to the left belongs to the 58th column (column 57).

The horizontal bit sequences in the y-code code the positions 0 4 1 3 in the number series. As these horizontal bit sequences start in the 58th column, the start position of the rows is these values minus 57 modulo 7, which gives the start positions 6 3 0 2. Converted to digits in mixed base, this becomes 6-2, 3-2, 0-0, 2-2=4 1 0 0, where the third digit is the least significant digit in the number concerned. The fourth digit is then the most significant digit in the next number. It must in this case be the same as in the number concerned. (The exception is when the number concerned consists of highest possible digits in all positions. Then it is known that the commencement of the next number is one larger than the commencement of the number concerned.)

The position number is in mixed base 0*50+4*10+1*2+0*1=42.

The third horizontal bit sequence in the y-code thus belongs to the 43rd code window which has a start position 0 or 1, and as there are four rows in total for each such code window, the third row is number 43*4=172.

In this example, the position of the top left corner of the partial surface with 4*4 marks is (58,170).

As the vertical bit sequences in the x-code in the 4*4 group start at row 170, the whole pattern's x-columns start in the number series' positions ((2 0 4 6)–169) mod 7=1 6 3 5. Between the last start position (5) and the first start position the numbers 0-19 are coded in mixed base, and by adding the representations of the numbers 0-19 in mixed base the total difference between these columns is obtained. A primitive algorithm for doing this is to generate these twenty numbers and directly add their digits. Call the sum obtained s. The page or writing surface is then given by (5-s)modulo7.

An alternative method for determining which bit is the least significant in a partial surface, in order to be able to identify a code window in this way, is as follows. The least significant bit (LSB) is defined as the digit which is the lowest in a partial surface's differences or row position number. In this way, the reduction (redundancy) of the maximum useable number of coordinates is relatively small. For example, the first code windows in the x-direction in the example above can all have LSB=1 and other digits between 2 and 6, which gives 25 code windows, the next can have LSB=2 and other digits between 3 and 6, which gives 16 code windows, the next can have LSB=3 and other digits between 4 and 6, which gives 9 code windows, the next can have LSB=4 and other digits between 5 and 6, which gives 4 code windows, the next can have LSB=5 and other digits 6, which gives 1 code window, that is a total of 55 code windows, compared to 32 in the example above.

In the example above, an embodiment has been described where each code window is coded by 4*4 marks and a number series with 7 bits is used. This is, of course, only one example. Positions can be coded by more or fewer marks. There does not need to be the same number in both directions. The number series can be of different lengths and does not need to be binary, but can be based on a different base, for example hex code. Different number series can be used for coding in the x-direction and coding in the y-direction. The marks can represent different numbers of values. The coding in the y-direction can also be carried out by differences.

In a practical example, a partial surface is used consisting of 6*6 marks and where the bit series as a maximum can consist of $2^6$ bits, that is 64 bits. However, a bit series consisting of 51 bits is used, and consequently 51 positions, in order to have the possibility of determining the rotational position of the partial surface. An example of such a bit series is:

00000110001111101010110110
0110100010100111011110010

Such a partial surface consisting of six by six marks can code $4^{6*6}$ positions, which with the above raster dimensions of 0.3 mm is an extremely large surface.

In a similar way as described above for the seven-bit series, according to this invention the characteristic is utilized that the partial surface is enlarged to include one bit on each side of the partial surface, at least at its center, so that for the third and fourth rows in the partial surface of 6*6 symbols, 8 symbols are read off, one on each side of the partial surface, and similarly in the y-direction. The above-mentioned bit series which contains 51 bits has the characteristic that a bit sequence of 6 bits occurs only once and that a bit sequence of 8 bits which contains the above bit sequence of 6 bits occurs only once and never in an inverted position or reversed and inverted. In this way, the rotational position of the partial surface can be determined by reading off 8 bits in row 3, row 4, column 3 and/or column 4. When the rotational position is known, the partial surface can be rotated to the correct position before the processing is continued.

It is desirable to obtain a pattern which is as random as possible, that is where areas with excessive symmetry do not occur. It is desirable to obtain a pattern where a partial surface with 6*6 marks contains marks with all the different positions in accordance with FIGS. 5a to 5d. In order to increase the randomness further or avoid repetitive characteristics, a method can be used which is called "shuffle". Each bit sequence in a code window starts in a predetermined start position. However, it is possible to displace the start position in the horizontal direction for each row, if the displacement is known. This can be carried out by each least significant bit (LSB) being allocated a separate displacement vector for the adjacent rows. The displacement vector states by how much each row is displaced in the horizontal direction. Visually it can be regarded as if the y-axis in FIG. 4 is "spiky".

In the example above, with a 4*4 code window the displacement vector can be 1, 2, 4, 0 for LSB=0 and 2, 2, 3, 0 for LSB=1. This means that after subtracting the numbers 2 and 0 respectively, the above displacement is to be subtracted (modulo five) from the bit sequence's position number, before the calculating continues. In the example above, for the y-coordinate the digits 4 1 0 0 ($S_2, S_1, S_0, S_4$) are obtained in mixed base, the second digit from the right being the least significant digit, LSB. As the displacement vector 1, 2, 4, 0 is to be used (LSB=0) for the digits 4 and 1, 2 is subtracted from 4 to give $S_2$=2 and 4 is subtracted from 1 (modulo five) to give $S_1$=2. The digit $S_0$=0 remains unchanged (the displacement vector's component for the least significant digit is always zero). Finally, the digit $S_4$ belongs to the next code window, which must have LSB=1, that is the second displacement vector is to be used. Thus 2 is subtracted from 0 (modulo five) which gives $S_4$=3.

A similar method can be used to change the codes for the x-coordinates. However, there is less need to change the x-coordinates, as they are already relatively randomly distributed, as the difference zero is not used, in the example above.

In the example above, the mark is a dot. Naturally it can have a different appearance. It can, for example, consist of a line or an ellipse, which starts at the virtual raster point and extends from this to a particular position. Other symbols than a dot can be used, such as a square, rectangle, triangle, circle or ellipse, filled-in or not.

In the example above, the marks are used within a square partial surface for coding a position. The partial surface can be another shape, for example hexagonal. The marks do not need to be arranged along the raster lines in an orthogonal raster but can also have other arrangements, such as along the raster lines in a raster with 60 degree angles, etc. A polar coordinate system can also be used.

Rasters in the form of triangles or hexagons can also be used. For example, a raster with triangles enables each mark to be displaced in six different directions, which provides even greater possibilities, corresponding to $6^{6*6}$ partial surface positions. For a hexagonal raster, a honeycomb pattern, each mark can be displaced in three different directions along the raster lines.

As mentioned above, the marks do not need to be displaced along the raster lines but can be displaced in other directions, for example in order to be located each in a separate quadrant of a square raster pattern. In the hexagonal raster pattern the marks can be displaced in four or more different directions, for example in six directions along the raster lines and along lines which are at 60 degrees to the raster lines.

In order for the position code to be detected, it is necessary for the virtual raster to be determined. This can be carried out, in a square raster pattern, by examining the distance between the different marks. The shortest distance between two marks must originate from two adjacent marks with the values 1 and 3 in the horizontal direction or 2 and 4 in the vertical direction, so that the marks lie on the same raster line between two raster points. When such a pair of marks has been detected, the associated raster points (the nominal positions) can be determined using knowledge of the distance between the raster points and the displacement of the marks from the raster points. Once two raster points have been located, additional raster points can be determined using the measured distance to other marks and from knowledge of the distance between the raster points.

If the marks are displaced 50 μm along the raster lines, which are a distance of 300 μm apart, the least distance between two marks will be 200 μm, for example between marks with the values 1 and 3. The next smallest distance arises between, for example, marks with the values 1 and 2, and is 255 μm. There is therefore a relatively distinct difference between the least and the next smallest distance. The difference in any diagonals is also great. However, if the displacement is larger than 50 μm, for example more than 75 μm (¼), diagonals can cause problems and it can be difficult to determine to which nominal position a mark belongs. If the displacement is less than 50 μm, for example less than approximately 35 μm (⅛), the least distance will be 230 μm, which does not give a very large difference to the next distance, which is then 267 μm. In addition, the demands on the optical reading off increase.

The marks should not cover their own raster point and should therefore not have a larger diameter than twice the displacement, that is 200%. This is, however, not critical, and a certain overlapping can be permitted, for example 240%. The least size is determined initially by the resolution of the sensor and the demands of the printing process used to reproduce the pattern. However, the marks should not have a smaller diameter than approximately 50% of the displacement in practice, in order to avoid problems with particles and noise in the sensor.

In the embodiment above, the raster is an orthogonal grid. It can also have other forms, such as a rhombic grid, for example with 60 degree angles, a triangular or hexagonal grid, etc.

Displacement in more or less than four directions can be used, for example displacement in three directions along a hexagonal virtual raster. In an orthogonal raster only two displacements can be used, in order to facilitate the recreation of the raster. However, a displacement in four directions is preferred, but six or eight directions are also possible.

In the embodiment above, the longest possible cyclic number series is not used. Thus a degree of redundancy is obtained, which can be used in various ways, for example to carry out error correcting, replace missing or hidden marks, etc.

What I claim and desire to secure by Letters Patent is:

1. A system for information management, comprising:
a central unit; and
a plurality of user units which are arranged to record and send information to the central unit, wherein particulars are stored in the central unit about a plurality of regions, each of which represents an area on at least one two-dimensional coordinate reference, wherein the two dimensional coordinate reference represents physical positions in a unique and continuous manner, and wherein the physical positions are coded by a position coding pattern and wherein the position coding pattern is incapable of being present in its entirety on any single base,
each of the user units is arranged to record information which comprises at least one position on the two-dimensional coordinate reference and to send the information to the central unit, and
the central unit is arranged, in response to the receipt of the information from a user unit, to identify to which region said at least one position belongs and to determine how the information is to be managed based on the region affiliation.

2. A system according to claim 1, in which for each of said regions particulars are stored in the central unit about an owner of the region.

3. A system according to claim 1, in which rules for each region are stored in the central unit for how the information which is identified as belonging to the region is to be managed.

4. A system according to claim 1, in which the central unit is arranged to forward the information which is received from the user unit to a recipient.

5. A system according to claim 4, in which the recipient is defined by the region affiliation.

6. A system according to claim 4, in which the recipient is one of said user units.

7. A system according to claim 4, in which the central unit is arranged to attach a predetermined data packet for the recipient, which data packet is determined by the region affiliation.

8. A system according to claim 1, in which the central unit is arranged to store the information which is received from the user unit in a location which is indicated by the region affiliation.

9. A system according to claim 1, in which the central unit is arranged to process the information which is received from the user unit in a way which is defined by the region affiliation.

10. A system according to claim 1, in which said at least one position is a plurality of positions which define characters and in which the central unit is arranged to convert the received positions to at least one character.

11. A system according to claim 1, in which each of the user units has a pen point.

12. A system according to claim 1, in which each of the user units has a unique user identity and is arranged to include the user identity in the information to the central unit.

13. A system according to claim 1, further comprising a plurality of products from which said at least one position is recorded.

14. A system according to claim 13, in which a subset of a position-coding pattern, which codes a large number of positions on said two-dimensional coordinate reference is reproduced on each of said products, the positions which are recorded by the user units being positions on the two-dimensional coordinate reference and being recorded by means of the subset of the position-coding pattern on the product.

15. A system according to claim 14, in which the position-coding pattern is constructed of symbols and each position on said two-dimensional coordinate reference is coded by a predetermined number of symbols, and in which each user unit is arranged to continually record the symbols to provide a description of the movement in the form of coordinates when it is moved across said subset in order to generate the information.

16. A system according to claim 1, in which each user unit is arranged to record said information by recording at least two coordinates in coded form for each position, to decode the coded coordinates and to include at least certain of the coordinates in the information to the central unit.

17. A central unit for information management, comprising:
a memory storing particulars about a plurality of regions, each region corresponding to an area on a two dimensional coordinate reference, wherein the two dimensional coordinate reference represents physical positions in a unique and continuous manner, wherein the physical positions are coded by a position coding pattern, and the position coding pattern is incapable of being present in its entirety on any single base, and the memory further containing instructions for
determining, in response to the receipt of information which contains at least one position on the two dimensional coordinate reference, to which region said at least one position belongs, and determining how the information is to be managed based on the region affiliation.

18. A central unit for information management, comprising:
a memory storing particulars about a plurality of regions, each region corresponding to an area on a two dimensional coordinate reference, wherein the represents two dimensional coordinate reference physical positions in a unique and continuous manner, and the two dimensional coordinate reference represents a physical area which is incapable of being present in its entirety on any single base, and the memory further containing instructions for
determining, in response to the receipt of information which contains at least one position on the two dimensional coordinate reference, to which region said at least one position belongs, and determining how the information is to be managed based on the region affiliation.

19. A system for information management, comprising:
a central unit and a plurality of user units which are arranged to record and send information to the central unit; and
a plurality of products each of which has a subset of a position-coding pattern, which codes a large number of positions on at least one imaginary surface, wherein the imaginary surface represents physical positions in a unique and continuous manner, and wherein the physical positions are coded by the position coding pattern and wherein the position coding pattern is incapable of being present in its entirety on any single product, further wherein
particulars are stored in the central unit about a plurality of regions, each of which represents an area on said imaginary surface, wherein
each of the user units is arranged to record information which comprises at least one position on the imaginary surface by means of the subset of the position-coding pattern on said product, and to send the information to the central unit, and wherein
the central unit is arranged, in response to the receipt of the information from a user unit, to identify to which region said at least one position belongs and to determine how the information is to be managed based on the region affiliation.

20. A central unit for information management, comprising:
a memory storing particulars about a plurality of regions, each region corresponding to an area on an imaginary surface, wherein the imaginary surface represents physical positions in a unique and continuous manner, and represents a physical area which is incapable of being present in its entirety on any single base, and the memory further containing instructions for determining, in response to the receipt of information which contains at least one position on the imaginary surface, to which region said at least one position belongs, and determining how the information is to be managed based on the region affiliation.

21. A central unit according to claim 20, which for each of said regions stores particulars about an owner of the region.

22. A central unit according to claim 20, which for each of said regions stores rules for how information which is identified as belonging to the region is to be managed.

23. A central unit according to claim 20, which is arranged to forward the information to a recipient.

24. A central unit according to claim 20, which is arranged to attach a predetermined file with the information for the recipient, which file is determined by the region affiliation.

25. A method for managing information based upon position associated with a machine-readable code, comprising:
recording information using at least one user unit, wherein the information includes at least one position on a two dimensional coordinate reference, further wherein the two dimensional coordinate reference represents physical positions in a unique and continuous manner, wherein the physical positions are coded by a position coding pattern, and the position coding pattern is incapable of being present in its entirety on any single surface;
sending the information to a central unit, wherein the central unit contains particulars about a plurality of regions, and further wherein each region represents an area on the two dimensional coordinate reference;
identifying which region the at least one position belongs in response to the receipt of the information; and
managing the information based upon rules associated with the identified region, wherein different regions are associated with different rules.

26. A central unit according to claim 20, which is arranged to process the information in a way which is defined by the region affiliation.

27. A central unit according to claim 26, which is arranged to convert the received positions into at least one character.

28. A method for management of information which is recorded using at least one user unit, comprising:
recording information by each user unit which includes at least one position on at least one imaginary surface, wherein the imaginary surface represents physical positions in a unique and continuous manner, and represents a physical area which is incapable of being present in its entirety on any single base;

receiving said information at a central unit, wherein the central unit contains particulars about a plurality of regions, further wherein each region represents an area on the at least one imaginary surface;

identifying, in response to the receipt of the information from the user unit, which region said at least one position belongs; and determining how to manage the information based on the region affiliation.

29. A method according to claim 28, in which for each region particulars are stored in the central unit about the owner of the region.

30. A method according to claim 28, in which for each region rules are stored in the central unit for how the information which is identified as belonging to the region is to be managed.

31. A method according to claim 28, in which the central unit forwards the information which is received from the user unit to a recipient.

32. A method according to claim 31, in which the recipient is defined by the region affiliation.

33. An apparatus for managing information based upon machine-readable code associated with products which are not colocated, comprising:

at least one user unit configured to record information including at least one position described in a two dimensional coordinate reference, further wherein the two dimensional coordinate reference represents physical positions in a unique and continuous manner, wherein the physical positions are coded by a position coding pattern, and the coding pattern is incapable of being present in its entirety on any single surface; and a central unit, configured to receive the information from the at least one user unit, which identifies a region on the two dimensional coordinate reference based upon the at least one position, and manages the information based upon rules associated with the identified region, wherein different regions are associated with different rules.

34. A method according to claim 31, in which the central unit attaches a predetermined data packet for the recipient, which data packet is determined by the region affiliation.

35. A method according to claim 28, in which the central unit stores the information which is received from the user unit in a location which is indicated by the region affiliation.

36. A method according to claim 28, in which the central unit processes the information which is received from the user unit in a way which is defined by the region affiliation.

37. A method according to claim 28, in which said at least one position is a plurality of positions which define characters, the central unit converting the received positions to at least one character.

38. A method according to claim 28, in which each user unit has a unique user identity and includes the user identity in the information which is sent to the central unit.

39. A method according to claim 28, in which said at least one position is recorded on a product.

40. A method according to claim 28, in which each of the user units has a pen point which makes a mark on the a product during the recording of said at least one position.

41. The system according to claim 1, wherein the two-dimensional coordinate reference is an electronic representation of the position-coding pattern.

42. A method according to claim 41, in which the position-coding pattern is constructed of symbols and each position on said imaginary surface is coded by a predetermined number of symbols, each user unit, when it is moved across said subset to generate the information, continually recording the symbols to provide a description of the movement in the form of coordinates.

* * * * *